US007372770B2

(12) United States Patent
Ramakrishnan et al.

(10) Patent No.: US 7,372,770 B2
(45) Date of Patent: May 13, 2008

(54) ULTRASONIC DOPPLER SENSOR FOR SPEECH-BASED USER INTERFACE

(75) Inventors: Bhiksha Ramakrishnan, Watertown, MA (US); Kaustubh Kalgaonkar, Atlanta, GA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 57 days.

(21) Appl. No.: 11/519,372

(22) Filed: Sep. 12, 2006

(65) Prior Publication Data

US 2008/0071532 A1 Mar. 20, 2008

(51) Int. Cl.
*G01S 15/02* (2006.01)

(52) U.S. Cl. .......................................................... 367/96

(58) Field of Classification Search .................. 367/97, 367/96, 95, 94
See application file for complete search history.

(56) References Cited

U.S. PATENT DOCUMENTS 4,080,661 A 3/1978 Niwa
2007/0165881 A1 * 7/2007 Ramakrishnan et al. ...... 367/13

* cited by examiner

*Primary Examiner*—Dan Pihulic
(74) *Attorney, Agent, or Firm*—Dirk Brinkman; Clifton D. Mueller; Gene V. Vinokur

(57) ABSTRACT

A method and system detect speech activity. An ultrasonic signal is directed at a face of a speaker over time. A Doppler signal of the ultrasonic signal is acquired after reflection by the face. Energy in the Doppler signal is measured over time. The energy over time is compared to a predetermined threshold to detect speech activity of the speaker in a concurrently acquired audio signal.

20 Claims, 3 Drawing Sheets

100

200

ULTRASONIC DOPPLER SENSOR FOR SPEECH-BASED USER INTERFACE

FIELD OF THE INVENTION

The invention relates generally to speech-based user interfaces, and more particularly to hands-free interface.

BACKGROUND OF THE INVENTION

A speech-based user interface acquires speech input from a user for further processing. Typically, the speech acquired by the interface is processed by an automatic speech recognition system (ASR). Ideally, the interface responds only to the user speech that is specifically directed at the interface, but not to any other sounds.

This requires that the interface recognizes when it is being addressed, and only responds at that time. When the interface does accept speech from the user, the interface must acquire and process the entire audio signal for the speech. The interface must also determine precisely the start and the end of the speech, and not process signals significantly before the start of the speech and after the end of the speech. Failure to satisfy these requirements can cause incorrect or spurious speech recognition.

A number of speech-based user interfaces are known. These can be roughly categorized as follows.

Push-to-Talk

With this type of interface, the user must press a button only for the duration of the speech. Thus, the start and end of speech signals are precisely known, and the speech is only processed while the button is pressed.

Hit-to-Talk

Here, the user briefly presses a button to indicate the start of the speech. It is the responsibility of the interface to determine where the speech ends. As with push-to-talk interface, the hit-to-talk interface also attempts to ensure that speech is only when the button is pressed.

However, there are a number of situations where the use a button may be impossible, inconvenient, or simply unnatural, for example, any situation where the user's hands are otherwise occupied, the user is physically impaired, or the interface precludes the inclusion of a button. Therefore, hands-free interfaces have been developed.

Hands-Free

With hands-free speech-based interfaces, the interface itself determines when speech starts and ends.

Of the three types of interface, the hands-free interface is arguably the most natural, because the interface does not require an express signal to initiate or terminate processing of the speech. In most conventional hands-free interfaces, only the audio signal acquired by the primary sensor, i.e., the microphone, is analyzed to make start and end of the speech decisions.

However, the hands-free interface is the most difficult to implement because it is difficult to determine automatically when the interface is being addresses by just the user, and when the speech starts and ends. This problem becomes particularly difficult when the interface operates in a noisy or reverberant environment, or in an environment where there is additional unrelated speech.

One conventional solution uses "attention words." The attention words are intended to indicate expressly the start and/or end of the speech. Another solution analyzes an energy profile of the audio signal. Processing begins when there is a sudden increase in the energy, and stops when the energy decreases. However, this solution can fail in a noisy environment, or an environment with background speech.

A zero crossing rates of the audio signal can also be used. The zero-crossings occur when the speech signal changes between positive and negative. When the energy and zero-crossings are at predetermined levels, speech is probably present.

Another class of solutions uses secondary sensors to acquire secondary measurements of the speech signal, such as a glottal electromagnetic sensor (GEMS), a physiological microphone (P-mic), a bone conduction sensors, and an electroglottographs. However all of the above secondary sensors need to be mounted on the user of the interface. This can be inconvenient in any situation where it is difficult to forward the secondary signal to the interface. That is, the user may need to be 'tethered' to the interface.

An ideal secondary sensor for a hands-free, speech-based interface should be able to operate at a distance from the user. Video cameras could be used as effective far-field sensors for detecting speech. Video images can be used for face detection and tracking, and to determine when the user is speaking. However, cameras are expensive, and detecting faces and recognizing moving lips is tedious, difficult and error prone.

Another secondary sensor uses the Doppler effect. An ultrasonic transmitter and receiver are deployed at a distance from the user. A transmitted ultrasonic signal is reflected by the face of the user. As user speaks parts of the face move, which changes the frequency of the reflected signal. Measurements obtained from the secondary sensor are used in conjunction with the audio signal acquired by the primary sensor to detect when the user speaks.

In addition to being usable at a distance from the user, the Doppler sensor differs from conventional secondary sensors in another, crucial way. The measurements provided by conventional current secondary sensors are usually linearly related to the speech signal itself. The GEMS sensor provides measurements of the excitation function to the vocal tract. The signals acquired by P-mics, throat microphones and bone-conduction microphones are essentially a filtered versions of the speech signal itself.

In contrast, the signal acquired by the Doppler sensor is not linearly related to the speech signal. Rather, the signal expresses information related to the movement of the face while speaking. The relationship between facial movement and the speech is not obvious, and certainly not linear.

However, the Doppler sensors use a support vector machine (SVM) to classify the audio signal as speech or non-speech. The classifier must first be trained off-line on joint speech and Doppler recordings. Consequently, the performance of the classifier is highly dependent on the training data used. It may be that different speakers articulate speech in different ways, e.g., depending on gender, age, and linguistic class. Therefore, it may be difficult to train the Doppler-based secondary sensor for a broad class of users. In addition, that interface requires both a speech signal and the Doppler signal for speech activity detection.

Therefore, it desired to provide a speech activity sensor that does not require training of a classifier. It is also desired to detect speech only from the Doppler signal, without using any part of the concomitant audio signal. Then, as an advantage, the detection process can be independent of background "noise," be it speech or any other spurious sounds.

SUMMARY OF THE INVENTION

The embodiments of the invention provide a hands-free, speech-based user interface. The interface detects when speech is to be processed. In addition, the interface detects the start and end speech so that proper segmentation of the speech can be performed. Accurate segmentation of speech improves noise estimation and speech recognition accuracy.

A secondary sensor includes an ultrasonic transmitter and receiver. The sensor detects facial movement when the user of the interface speaks using the Doppler effect. Because speech detection can be entirely based only on the secondary signal due to the facial movement, the interface works well even in extremely noisy environments.

DETAILED DESCRIPTION OF THE PREFERRED EMBODIMENT

Interface Structure

Transmitter

Figure 1:
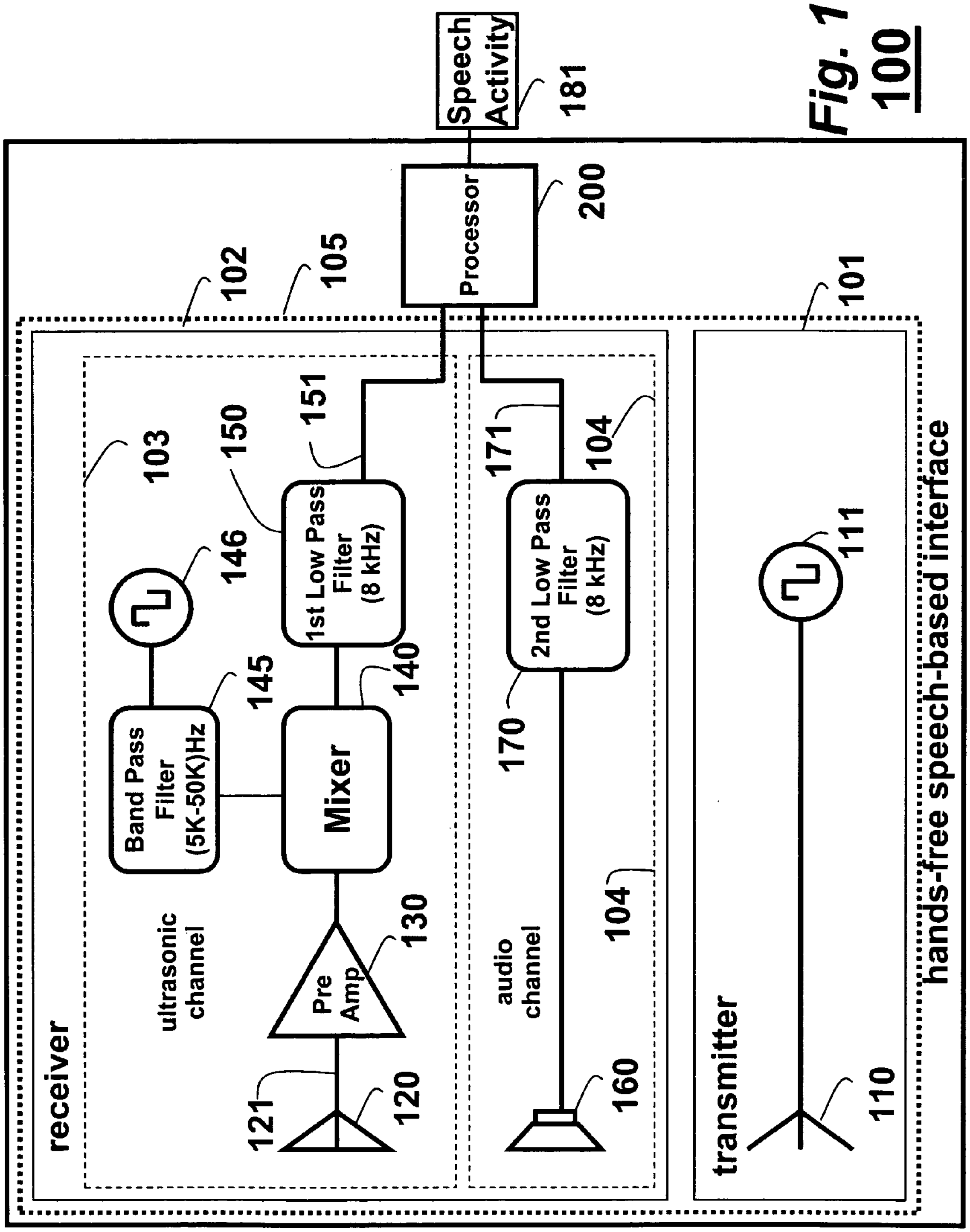
FIG. 1 is a block diagram of a hands-free speech-based user interface according to an embodiment of our invention.

FIG. 1 shows a hands-free, speech-based interface 100 according to an embodiment of our invention. Our interface includes a transmitter 101, a receiver 102, and a processor 200 executing the method according to an embodiment of the invention. The transmitter and receiver, in combination, form an ultrasonic Doppler sensor 105 according to an embodiment of the invention. Hereinafter, ultrasound is defined as sound with a frequency greater than the upper limit of human hearing. This limit is approximately 20 kHz.

The transmitter 101 includes an ultrasonic emitter 110 coupled to an oscillator 111, e.g., 40 kHz oscillator. The oscillator 111 is a microcontroller that is programmed to toggle one of its pins, e.g., at 40 kHz with a 50% duty cycle. The use of a microcontroller greatly decreases the cost and complexity of the overall design.

In one embodiment, the emitter has a resonant carrier frequency centered at 40 kHz. Although the input to the emitter is a square wave, the actual ultrasonic signal emitted is a pure tone due to a narrow-band response of the emitter. The narrow bandwidth of the emitted signal corresponds approximately to the bandwidth of a demodulated Doppler signal.

Receiver

The receiver 102 includes an ultrasonic channel 103 and an audio channel 104.

The ultrasonic channel includes a transducer 120, which, in one embodiment, has a resonant frequency of 40 kHz, with a 3 dB bandwidth of less than 3 kHz. The transducer 120 is coupled to a mixer 140 via a preamplifier 130. The mixer also receives input from a band pass filter 145 that uses, in one embodiment, a 36 KHz signal generator 146. The output of the mixer is coupled to a first low pass filter 150.

The audio channel includes a microphone 160 coupled to a second low pass filter 170. The audio channel acquires an audio signal. Hereinafter, an audio signal specifically means an acoustic signal that is audible. In a preferred embodiment, the audio channel is duplicated so that a stereo audio signal can be acquired.

Outputs 151 and 171 of the low pass filters 150 and 170, respectively, are processed 200 as described below. The eventual goal is to detect only speech activity 181 by a user of the interface in the received audio signal.

The transmitter 110 and the transducer 120 in the preferred embodiment have a diameter of approximately 16 mm, which is nearly twice the wavelength of the ultrasonic signal at 40 kHz. As a result, the emitted ultrasonic is spatially narrow beam, e.g., with a 3 dB beam width of approximately 30 degrees. This makes it possible for the ultrasonic signal to be highly directional. This decreases the likelihood of sensing extraneous signals not associated with facial movement. In fact, it makes sense to colocate the transducer 120 with the microphone 160.

Most conventional audio signal processors cut off received acoustic signals well below 40 kHz prior to digitization. Therefore, we heterodyne the received ultrasonic signal such that the resultant much lower "beat frequency" signal falls is within the audio range. Doing so also provides us with another advantage. The heterodyned signal can be sampled at audio frequencies, with the additional benefits in a reduction of computational complexity.

The signal 121 acquired by the transducer is pre-amplified 130 and input to the analog mixer 140. The second input to the mixer is a 36 kHz, as in our preferred embodiment, sinusoid signal. The sinusoid signal is generated by producing a 36 kHz 50% duty cycle square wave from the microcontroller. The square wave is bandpass filtered 145 with a fourth order active filter. The output of the mixer is then low-pass filtered 150 with a cutoff frequency of 8 kHz, as in our preferred embodiment.

The audio channel includes a microphone 160 to acquire the audio signal. In preferred embodiment, the microphone is selected to have a frequency response with a 3 dB cutoff frequency below 8 kHz. This ensures that the audio channel does not acquire the ultrasonic signal. The audio signal is further low-pass filtered by a second order RC filter 170 with a cut off frequency of 8 kHz.

The outputs 151 and 171 of the ultrasonic channel and the audio channel are jointly fed to the processor 200. The stereo signal is sampled at 16 kHz before the processing 200 to detect the speech activity 181.

Interface Operation

The ultrasonic transmitter 101 directs a narrow-beam, e.g., 40 kHz, ultrasonic signal at the face of the user of the interface 100. The signal emitted by the transmitter is a continuous tone that can be represented as $s(t)=\sin(2\pi f_c t)$, where $f_c$, is the emitted frequency, e.g., 40 kHz in our case.

The user's face reflects the ultrasonic signal as a Doppler signal. Herein, the Doppler signal generally refers to the reflected ultrasonic signal. While speaking, the user moves articulatory facial structures including but not limited to the mouth, lips, tongue, chin and cheeks. Thus, the articulated face can be modeled as a discrete combination of moving articulators, where the $i^{th}$ component has a time-varying velocity $v_i(t)$. The low velocity movements cause changes in wavelength of the incident ultrasonic signal. A complex articulated object, such as the face, exhibits a range of velocities while in motion. Consequently, the reflected Doppler signal has a spectrum of frequencies that is related to the entire set of velocities of all parts of the face that move as the user speaks. Therefore, as stated above, the bandwidth of the ultrasonic signal corresponds approximately to the bandwidth of frequencies at which the facial articulators move.

The Doppler effect states that if a tone of frequency f is incident on an object with velocity v relative to a sensor 120, the frequency $\hat{f}$ of the reflected Doppler signal is given by $$\hat{f} = \frac{v_s + v}{v_s - v} f \approx \left(1 + \frac{2v}{v_s}\right) f, \tag{1}$$

where $v_s$ is the speed of sound in a particular medium, e.g., air. The approximation to the right in Equation (1) holds true if $v << v_s$, which is true for facial movement.

The various articulators have different velocities. Therefore, each articulator reflects a different frequency. The frequencies change continuously with the velocity of the articulators. The received ultrasonic signal can therefore be considered as sum of multiple frequency modulated (FM) signals, all modulating the same carrier frequency ($f_c$). The FM can be modeled as:

$$d(t) = \sum_i a_i \sin\left(2\pi f_c\left(t + \frac{2}{v_s}\int_0^t v_i(\tau)d\tau\right) + \phi_i\right), \tag{2}$$

where $V_i(\tau)$ is the velocity at a specific instant of time '$\tau$'.

Equation (2) uses the approximate form of the Doppler Equation (1). The variable $a_i$ is the amplitude of the signal reflected by the $i^{th}$ articulated component. This variable is related to the distance of the component from the sensor. Although $a_i$ is time varying, the changes are relatively slow, compared to the sinusoidal terms in Equation 2. We assume the term to be a constant gain term.

The variable $\phi_i$ is a phase term intended to represent relative phase differences between the Doppler signals reflected by the various moving articulators. If $f_c$ is the carrier frequency, then Equation (2) represents the sum of multiple frequency modulated (FM) signals, all operating on the single carrier frequency $f_c$.

Most of the information relating to the movement of facial articulators resides in the frequency of the signals in Equation (1). In preferred embodiment, we demodulate the signal such that this information is also expressed in the amplitude of the sinusoidal components, so that a measure of the energy of these movements can be obtained.

Conventional FM demodulation proceeds by eliminating amplitude variations through hard limiting and band-pass filtering, followed by differentiating the signal to extract the 'message' into the amplitude of the sinusoid signal, followed finally by an envelope detector.

Our FM demodulation is different. We do not perform the hard-limiting and band-pass filtering operation because we want to retain the information in the amplitude $\alpha_i$. This gives us an output that is more similar to spectral-decomposition of the ultrasonic signal.

The first step differentiates the received ultrasonic signal d(t). From Equation (2) we obtain $$\frac{d}{dt}d(t) = \sum_i 2\pi a_i f_c\left(1 + \frac{2v_i(t)}{v_s}\right)\cdot\cos\left(2\pi f_c\left(1 + \frac{2}{v_s}\int_0^t v_i(\tau)d\tau\right) + \phi_i\right) \tag{3}$$

The derivative of d(t) is multiplied by the sinusoid of frequency $f_c$. This gives us:

$$\begin{aligned}\sin(2\pi f_c t)\frac{d}{dt}d(t) = &\\ &\sum_i 2\pi a_i f_c\left(1 + \frac{2v_i(t)}{v_s}\right)\sin(2\pi f_c t)\cdot\cos\left(2\pi f_c\left(t + \frac{2}{v_s}\int_0^t v_i(\tau)d\tau\right) + \phi_i\right)\\ &\sum_i 2\pi a_i f_c\left(1 + \frac{2v_i(t)}{v_s}\right)\left(-\sin\left(\frac{2\pi f_c}{v_s}\int_0^t v_i(\tau)d\tau + \phi_i\right) + \right.\\ &\left.\sin\left(4\pi f_c t + \frac{2\pi f_c}{v_s}\int_0^t v_i(\tau)d\tau + \phi_i\right)\right)\end{aligned} \tag{4}$$

A low-pass filter with a cut-off below $f_c$ cut off the second sinusoid on the right in Equation 4 finally giving us:

$$\begin{aligned}LPF\left(\sin(2\pi f_c t)\frac{d}{dt}d(t)\right) = &\\ &-\sum_i 2\pi a_i f_c\left(1 + \frac{2v_i(t)}{v_s}\right)\sin\left(\frac{2\pi f_c}{v_s}\int_0^t v_i(\tau)d\tau + \phi_i\right),\end{aligned} \tag{5}$$

where LPF represents the low-pass-filtering operation.

The signal represented by Equation (5) encodes velocity terms in both amplitudes and frequencies. If the signal is analyzed using relatively short analysis frames, the velocities of the frequencies do not change significantly within a particular analysis frame, and the right hand side of Equation (5) can be interpreted as a frequency decomposition of the left hand side.

The signal contains energy primarily at frequencies related to the various velocities of the moving articulators. The energy at any velocity is a function of the number and distance of facial articulators moving with that velocity, as well as the velocity itself.

Speech Activity Detection

Figure 2:
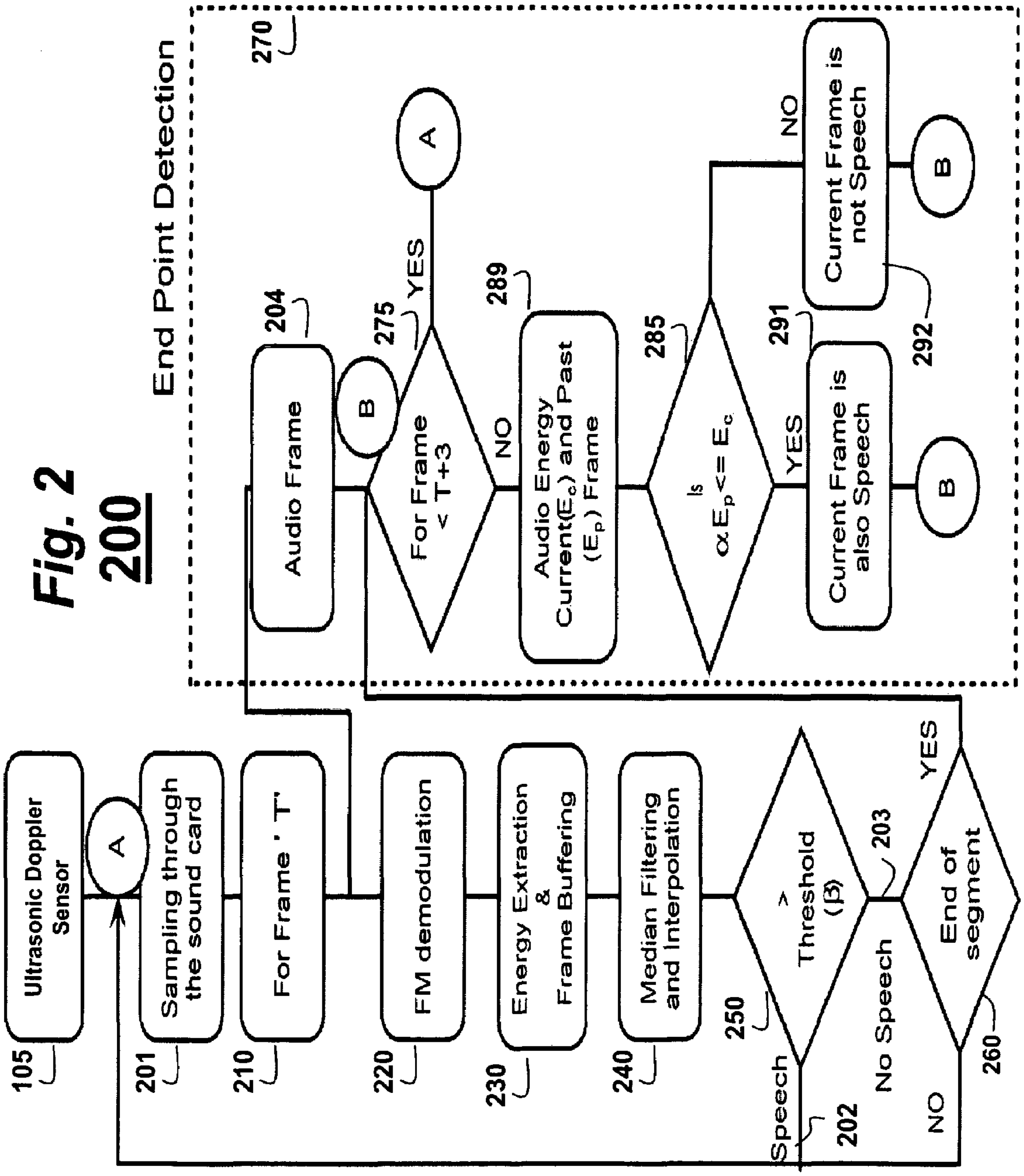
FIG. 2 is a flow diagram of a method for detecting speech activity using the interface of FIG. 1.
Figure 3A:
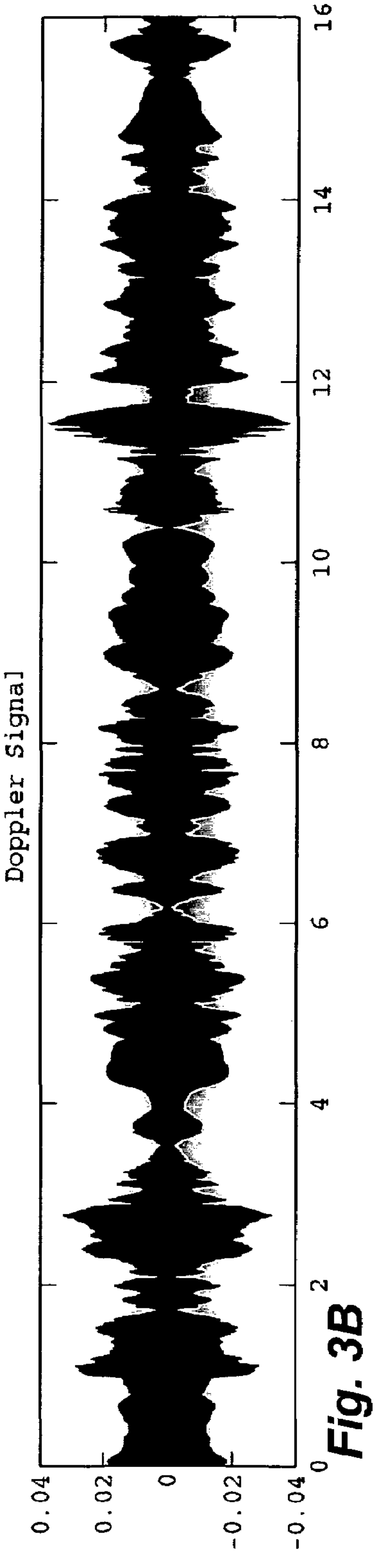
FIGS. 3A-3C are timing diagrams of primary and secondary signals acquired and processed by the interface of FIG. 1 and the method of FIG. 2.
Figure 3B:
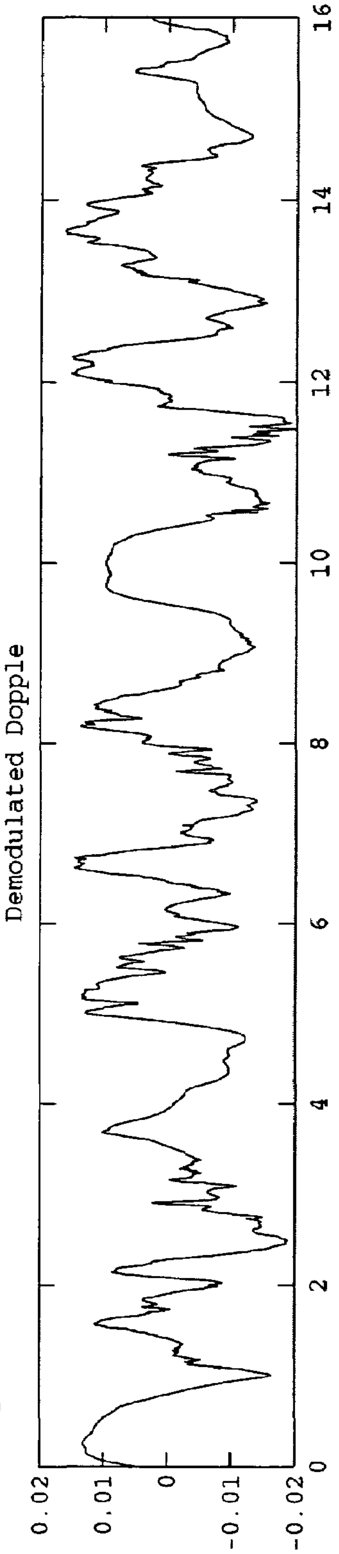
Figure 3C:
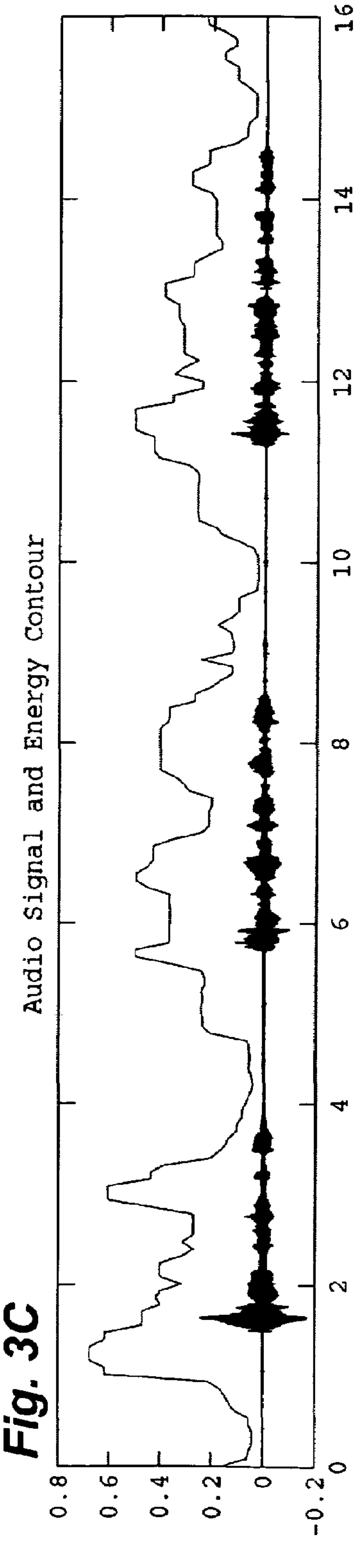

FIG. 2 shows the method 200 for speech activity detection according to an embodiment of the invention. The ultrasonic Doppler signal 151 and the audio signal 171 acquired by the ADS 105 are both sampled 201 at 16 kHz. FIG. 3A shows the reflected Doppler signal. In FIGS. 3A-3B, the vertical axis is amplitude. FIG. 3C also shows the normalized energy contour of the Doppler signal. The horizontal axis is time.

The signals are then partitioned 210 into frames using, e.g., a 1024 point Hamming window.

The audio signal 171 is processed only while speech activity 181 from the user is detected.

Facial articulators are relatively slowly moving. The frequency variations due to their velocity are low. The ultrasonic signal is demodulated 220 into a range of frequency range, e.g., 25 Hz to 150 Hz. Frequencies outside this range, although potentially related to speech activity, are usually corrupted by the carrier frequency, as well as harmonics of the speech signal including any background speech or babble, particularly in speech segments. FIG. 3B shows the demodulated Doppler signal.

To obtain the frequency resolution needed for analyzing the ultrasonic signal, the frame size is a relatively large, e.g., 64 ms. Each frame includes 1024 samples. Adjacent frames overlap by 50%.

From each frame of the demodulated and windowed Doppler signal, we extract 230 discrete Fourier transform (DFT) coefficients for eight bins in a frequency range from 25 Hz to 150 Hz. In our preferred implementation, we actually use the well known Goertzel's algorithm, see e.g., U.S. Pat. No. 4,080,661 issued to Niwa on Mar. 21, 1978, "Arithmetic unit for DFT and/or IDFT computation," incorporated herein by reference.

The energy in these frequency bands is determined from the DFT coefficients. Typically, the sequence of energy values is very noisy. Therefore, we "smooth" 240 the energy using a five point median filter.

FIG. 3C shows the energy contour as well as the audio signal. The Figure shows that the energy in the Doppler signal is correlated to speech activity.

To determine if the $t^{th}$ frame of audio signal represents speech, the median filtered energy value $E_d(t)$ of the Doppler signal in the corresponding frame is compared 250 to an adaptive threshold $\beta_t$ to determine whether the frame indicates speech activity 202, or not 203. The threshold for the $t^{th}$ frame is adapted as follows:

$$\beta_t = \beta_{t-1} + \mu(E_d(t) - E_d(t-1)),$$

where $\mu$ is an adaptation factor that can be adjusted for optimal performance.

If the frame is not indicative of speech, then we assume an end of an utterance 260 event. An utterance is defined as a sequence of one or more frames of speech activity followed by a frame that is speech. The energy $E_c$ of the current audio frame 204 and the energy $E_p$ of the last confirmed frame 289 that includes speech are compared 285 according to $\alpha E_p \leqq E_c$. The scalar $\alpha$ is a selectable non-speech parameter between 0 and 1 to determine speech and non-speech frames 291-292, respectively.

This event initiates end of speech detection 270, which operates only on the audio signal. The method continues 275 to detect speech up to three frames after the end of utterance event. Finally, adjacent speech segments that are within 200 ms of each other are merged.

EFFECT OF THE INVENTION

The interface according to the embodiments of the invention detects speech only when speech is directed at the interface. The interface also concatenates adjacent speech utterances. The interface excludes non-speech audio signals.

The ultrasonic Doppler sensor is accurate at SNRs as low as −10 dB. The interface is also relatively insensitive to false alarms.

The interface has several advantages. It is inexpensive, has low false trigger rate and is not affected by ambient out-of-band noise. Also, due to the finite range of the ultrasonic receiver, the output is not affected by distant movements.

The interface only uses the Doppler signals to make the initial decision whether speech activity is present or not. The audio signal can be used optionally to concatenate adjacent short utterance into continuous speech segments.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for detecting speech activity, comprising:
directing an ultrasonic signal at a face of a speaker over time;
acquiring a Doppler signal of the ultrasonic signal after reflection by the face;
measuring an energy in the Doppler signal over time; and
comparing the energy over time to a predetermined threshold to detect speech activity of the speaker.

2. The method of claim 1, further comprising:
frequency demodulating the Doppler signal before the measuring.

3. The method of claim 2, in which the frequency demodulation is into a range of frequency bands.

4. The method of claim 1, further comprising:
sampling the Doppler signal; and
partitioning the samples into frames before the measuring.

5. The method of claim 4, in which the frames overlap in time.

6. The method of claim 2, further comprising:
extracting discrete Fourier transform (DFT) coefficients from the demodulated Doppler signal; and
measuring the energy from the DFT coefficients.

7. The method of claim 1, further comprising:
filtering the Doppler signal to smooth the energy before the measuring.

8. The method of claim 7, further comprising:
determining a medium of the energy over time before the comparing using the filtering.

9. The method of claim 1, further comprising:
acquiring concurrently an audio signal while acquiring the Doppler signal; and
processing the audio signal only while detecting the speech activity.

10. The method of claim 1, further comprising:
heterodyning the Doppler signal before the measuring.

11. The method of claim 1, in which the ultrasonic signal is spatially narrow beam.

12. The method of claim 11, in which the ultrasonic signal has a bandwidth corresponding to a bandwidth of the demodulated Doppler signal.

13. The method of claim 9, in which the acquiring is performed with colocated sensors.

14. The method of claim 1, in which a bandwidth of the ultrasonic signal corresponds to a bandwidth of frequencies at which articulator of the face move while speaking.

15. The method of claim 2, in which the energy is obtained from an amplitude of the demodulated Doppler signal.

16. The method of claim 2, in which the demodulating is similar to spectral-decomposition of the ultrasonic signal.

17. The method of claim 1, further comprising:
sampling the ultrasonic signal to obtain overlapping frames.

18. A system for detecting speech activity, comprising:
a transmitter configured to direct an ultrasonic signal at a face of a speaker;
a receiver configured to acquire a Doppler signal of the ultrasonic signal after reflection by the face;
means for measuring an energy in the Doppler signal; and
means for comparing the energy to a threshold to detect speech activity.

19. An apparatus for detecting speech activity, comprising:
an emitter configured to direct an ultrasonic signal at a face of a speaker;
a transducer configured to acquire a Doppler signal of the ultrasonic signal after reflection by the face;
a microphone configured to acquire an audio signal; and
means coupled to the transducer and microphone to detect speech activity in the audio signal based on an energy of the Doppler signal.

20. The apparatus of claim 19, in which the emitter, transducer and microphone are colocated.

* * * * *